United States Patent
Griffiths et al.

(10) Patent No.: US 9,404,423 B2
(45) Date of Patent: Aug. 2, 2016

(54) FUEL STAGING SYSTEM

(75) Inventors: Michael Griffiths, Bromsgrove (GB); Jonathan David Pye, East Grinstead (GB)

(73) Assignee: ROLLS-ROYCE CONTROLS AND DATA SERVICES LIMITED, Derby (GB)

(*) Notice: Subject to any disclaimer, the term of this patent is extended or adjusted under 35 U.S.C. 154(b) by 1105 days.

(21) Appl. No.: 13/332,944

(22) Filed: Dec. 21, 2011

(65) Prior Publication Data

US 2012/0159953 A1 Jun. 28, 2012

(30) Foreign Application Priority Data

Dec. 22, 2010 (GB) .................................... 1021728.9
Jun. 24, 2011 (GB) .................................... 1110733.1

(51) Int. Cl.
F02C 7/22 (2006.01)
F02C 7/232 (2006.01)
F02C 9/34 (2006.01)
F02C 9/26 (2006.01)
F02C 7/228 (2006.01)

(52) U.S. Cl.
CPC .................. F02C 7/228 (2013.01); F02C 7/232 (2013.01); F02C 9/263 (2013.01); F02C 9/34 (2013.01)

(58) Field of Classification Search
CPC ............. F02C 7/22; F02C 7/222; F02C 7/228; F02C 7/232; F02C 9/263; F02C 9/34; F02C 9/32; F02C 9/36; F02C 9/38; F23R 3/34; F23R 3/343; F23R 3/346; F05D 2260/602; F23K 2301/203; F23K 5/18
See application file for complete search history.

(56) References Cited

U.S. PATENT DOCUMENTS

| | | | |
|---|---|---|---|
| 5,735,117 A * | 4/1998 | Toelle | 60/39.094 |
| 5,881,550 A | 3/1999 | Toelle | |
| 7,137,242 B2 | 11/2006 | Griffiths | |
| 2002/0053208 A1 | 5/2002 | Futa, Jr. et al. | |
| 2004/0025492 A1 * | 2/2004 | Griffiths et al. | 60/39.281 |
| 2008/0271456 A1 | 11/2008 | Scully et al. | |
| 2009/0320480 A1 | 12/2009 | Scully | |
| 2009/0320482 A1 * | 12/2009 | Scully | 60/746 |

FOREIGN PATENT DOCUMENTS

EP 2 138 688 12/2009

OTHER PUBLICATIONS

European Search Report dated Feb. 29, 2012.

* cited by examiner

Primary Examiner — Andrew Nguyen
(74) Attorney, Agent, or Firm — Oliff PLC

(57) ABSTRACT

A fuel staging system is described which comprises a staging valve 28 operable to divide a metered fuel supply between a pilot delivery line 18 and a mains delivery line 16, and a recirculation valve 54 connected to the mains delivery line 16 and operable to permit a recirculation fuel flow to be supplied to the mains delivery line 16 when the staging valve 28 occupies a position in which substantially no fuel is delivered to the mains delivery line 16 through the staging valve 28.

5 Claims, 4 Drawing Sheets

FUEL STAGING SYSTEM

FIELD OF INVENTION

This invention relates to a fuel staging system for use in controlling the supply of fuel to an aircraft gas turbine engine.

BACKGROUND

A typical fuel system associated with a gas turbine engine includes a fuel pump operable to deliver fuel via a metering valve and a pressure raising valve to a manifold from which the fuel is delivered through nozzles to the engine. Commonly the engine includes a group of nozzles operable to deliver a pilot flow of fuel to the engine and another group of nozzles operable to deliver a mains flow of fuel to the engine. By appropriate division of the metered flow of fuel between these groups of nozzles, enhanced combustion efficiency and a reduction in exhaust emissions can be achieved.

A staging valve is typically used to divide the metered flow of fuel between the groups of nozzles delivering the pilot and mains flows of fuel. For example, US2008/0271456 describes a fuel system incorporating such a valve. Other techniques whereby a metered flow of fuel can be divided between pilot and mains fuel deliveries involve controlling the operation of appropriate valves to determine whether or not fuel is supplied to the nozzles through which the mains flow is delivered at any given time. For example, the valves through which the fuel is supplied to the nozzles may be hydraulically controlled. An arrangement of this type is described in US2009/0320480.

SUMMARY

There is a desire to avoid or reduce the quantity of fuel that is "stagnant" within various lines or manifolds of the fuel system, for example when there is no flow to the nozzles which deliver fuel to the mains burners of the engine, as minimising this quantity of fuel can reduce degradation of the fuel. Primarily this is because the fuel lines carrying this fuel to the combustion chamber of the engine pass through a bypass duct and around the engine core, both of which are high temperature zones, and as a result significant heat transfer to the fuel can occur. The thermal degradation of the fuel, particularly if the fuel stagnates in these lines for a period of time, is undesirable, and can result in an effect known as lacquering, which can have a significant detrimental impact upon the operation of the fuel system.

BRIEF DESCRIPTION OF THE DRAWINGS

According to the present invention there is provided a fuel staging system comprising a staging valve operable to divide a metered fuel supply between a pilot delivery line and a mains delivery line, and a recirculation valve connected to the mains delivery line and operable to permit a recirculation fuel flow to be supplied to the mains delivery line when the staging valve occupies a position in which substantially no fuel is delivered to the mains delivery line through the staging valve.

It will be appreciated that, in such an arrangement, when the staging valve delivers no fuel to the mains delivery line, the recirculation valve can be opened or operated to maintain a circulation of fuel along the mains delivery line and thereby avoid stagnation of fuel therein. As a consequence, excessive heating and degradation of the fuel within the mains delivery line can be avoided.

DETAILED DESCRIPTION

Figure 1:
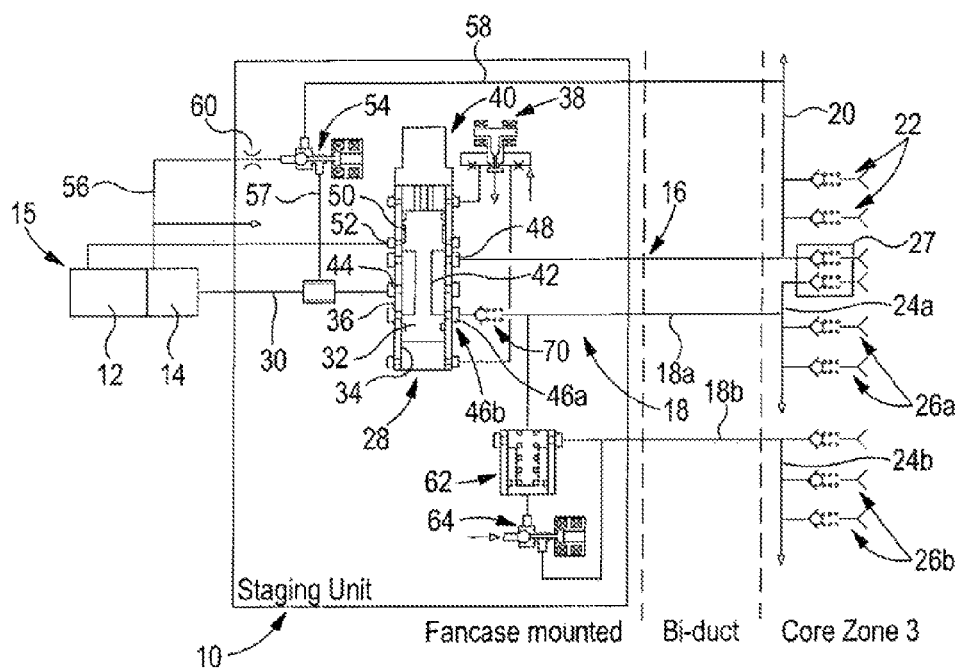

The system conveniently further includes a closable recirculation connection whereby fuel from the mains delivery line can be returned to a low pressure fuel zone when such a recirculating flow of fuel is taking place.

The closable recirculation connection may be provided by appropriate ports and formations of the staging valve. However, arrangements are also envisaged in which the closable recirculation connection is provided by a separate valve, for example independently of the staging valve.

The recirculation valve is preferably a solenoid operated valve. Alternatively, another suitable form of valve such as an electro-hydraulic servo-valve may be used.

The pilot delivery line and mains delivery line conveniently have associated therewith a plurality of fuel pressure operated nozzles with integrated check valves that are arranged to open when the fuel pressure within the associated delivery line exceeds a predetermined fuel pressure.

The pilot delivery line may include a segment closable by a lean blow out protection valve to control the number of pilot nozzles through which fuel is delivered. A solenoid operated control valve may be provided to control the operation of the lean blow out protection valve. In such an arrangement, when the fuel delivery rate is low, a proportion of the pilot nozzles may be disconnected, or the fuel flow thereto may be substantially reduced, thereby increasing the flow of fuel to the remainder of the pilot nozzles so that a lean blow out condition can be avoided, or the risk thereof can be reduced.

The fuel system may further comprise a staging metering valve located in one of the pilot and mains fuel delivery lines and operable to meter the supply of fuel through that delivery line, and a pressure drop control valve operable to control the position of the staging valve to maintain a substantially uniform pressure drop across the staging metering valve.

The staging metering valve is conveniently located in the pilot fuel delivery line.

In such an arrangement, the split of fuel between the pilot and mains fuel delivery lines is controlled by appropriate control over the position of the staging metering valve, the pressure drop control valve serving to maintain a substantially constant pressure drop across the staging metering valve, ensuring a specific pilot flow and hence a desired pilot/mains fuel split ratio is achieved for a given position of the staging metering valve. A wide range of split ratios can be achieved by appropriate control over the position of the staging metering valve.

According to another aspect of the present invention there is provided a fuel system comprising a staging valve operable to divide an inlet, metered fuel supply between a pilot fuel delivery line and a mains fuel delivery line, a staging metering valve located in one of the pilot and mains fuel delivery lines and operable to meter the supply of fuel through that delivery line, and a pressure drop control valve operable to control the position of the staging valve to maintain a substantially uniform pressure drop across the staging metering valve.

BRIEF DESCRIPTION OF THE DRAWINGS

Figure 2:
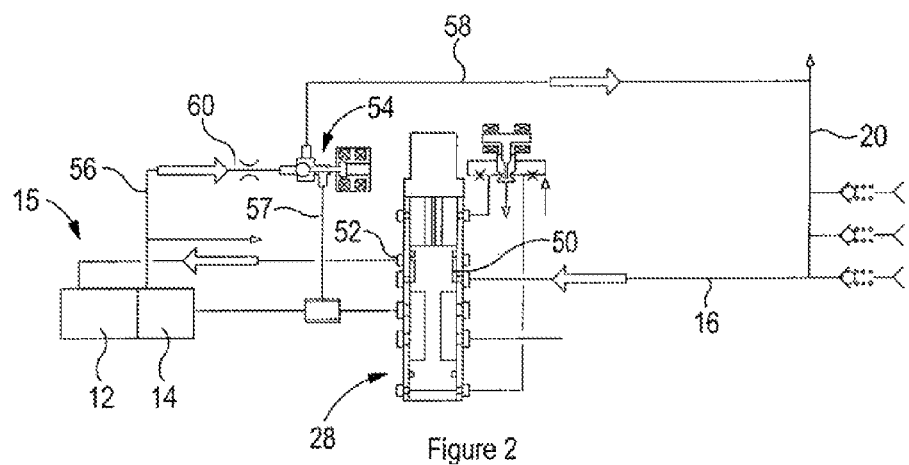
Figure 3:
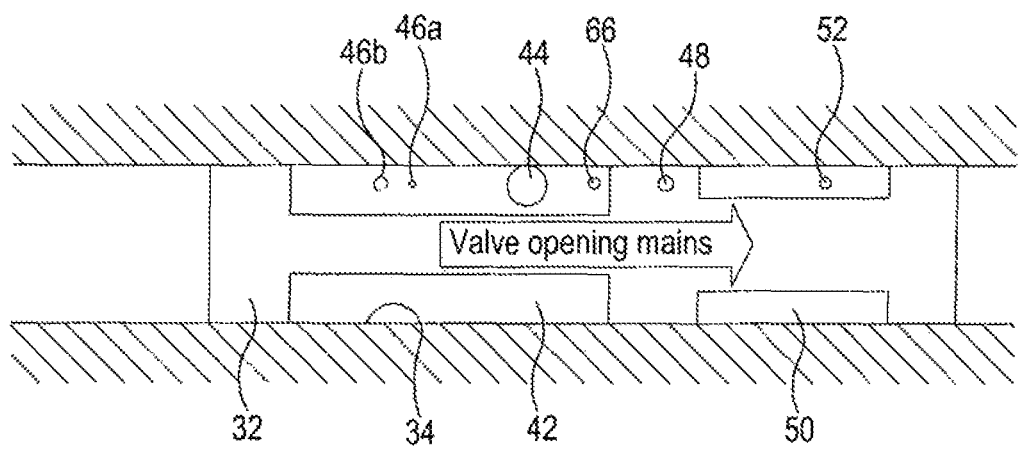
Figure 4:
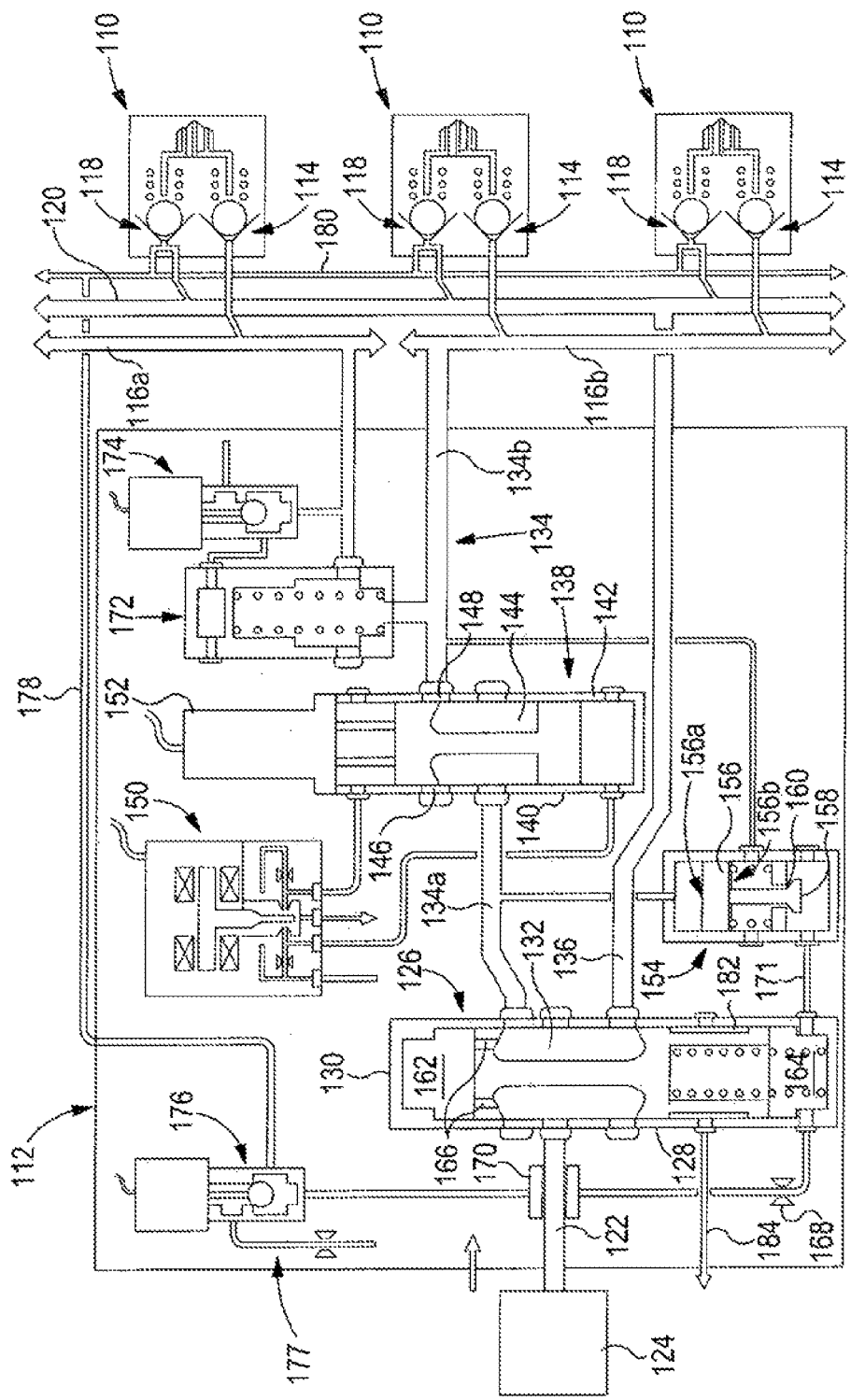

The invention will further be described, by way of example, with reference to the accompanying drawings, in which:

FIG. 1 is a schematic view illustrating a fuel staging system in accordance with one embodiment of the invention;

FIG. 2 is a view illustrating part of the system of FIG. 1 in an alternative operating mode;

FIG. 3 is a diagram illustrating a modification to the arrangement of FIGS. 1 and 2 and including a priming feature;

FIG. 4 illustrates an alternative embodiment; and

Figure 5:
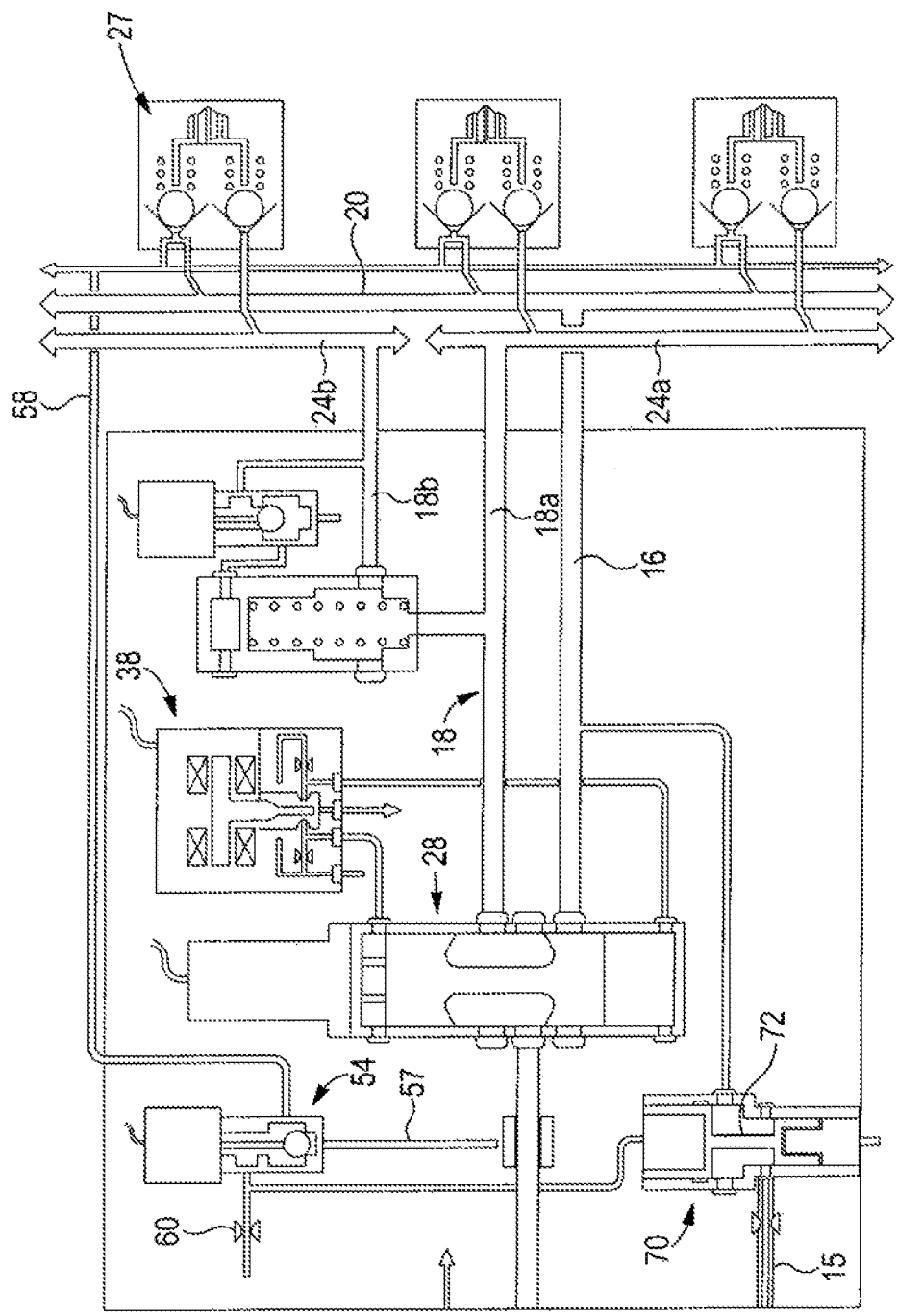

FIG. 5 illustrates an alternative scheme in which a separate valve is provided to provide a closable recirculation connection.

DETAILED DESCRIPTION

Referring firstly to FIG. 1 there is illustrated a fuel staging system 10 for use in controlling the delivery of fuel from a pumping unit 12 and metering unit 14 to a mains delivery line 16 and a pilot delivery line 18. The mains delivery line 16 is connected to a mains fuel manifold 20 to which a series of mains nozzle check valves 22 are connected. The nozzle check valves 22 are arranged to open, and so deliver fuel to associated mains nozzles and mains burners (not shown), when the fuel pressure within the mains manifold 20 exceeds a predetermined pressure, and to close, and so cease delivery of fuel to the mains nozzles, when the pressure is lower than a predetermined level. The pilot delivery line 18 is split into two segments 18a, 18b, each of which is connected to a respective pilot manifold 24a, 24b to which pilot nozzle check valves 26a, 26b are connected and arranged to open and so deliver fuel to the associated pilot nozzles and pilot burners (not shown) when the fuel pressure within the associated pilot manifold 24a, 24b exceeds a predetermined threshold, and close, and so cease delivery of fuel to the pilot nozzles, when the pressure therein is lower than a predetermined level. Although illustrated as separate nozzle check valves, each mains nozzle check valve 22 and an associated pilot nozzle check valve 24a, 24b could, if desired, be formed as a single unit 27 which could be integrated into the design of the associated mains and pilot nozzle housing (not shown) if desired.

The staging system 10 includes a staging valve 28 to which a metered flow of fuel is supplied from the metering unit 14 via a supply line 30. The staging valve 28 includes a spool 32 slidable within a bore 34 formed in a housing 36. The spool 32 occupies a position, at any given time, determined by the fuel pressure applied to the end surfaces thereof, and these are controlled, in use by a torque motor controlled valve 38. A position sensor 40 provides position feedback information for the spool 32 that can be used by an associated control unit (not shown) in providing closed loop control of the valve 38 and the spool 32. Conveniently, the valve 38 is designed in such a manner that, in the event of a failure, the spool 32 is moved to its lowermost, pilot delivery only (see description hereinafter), position. If desired, the valve 38 may take the form of a known two-stage electro-hydraulic servo-valve (EHSV) arrangement rather than the single stage arrangement illustrated.

The spool 32 includes an annular gallery 42 in constant communication, throughout the range of movement of the spool 32, with a supply port 44 connected to the supply line 30. The staging valve 28 further includes first and second pilot ports 46a, 46b connected to the pilot delivery line 18 and a mains port 48 connected to the mains delivery line 16 and, depending upon the position of the spool 32, the second pilot port 46b and the mains port 48 can be closed, no longer communicating with the gallery 42, whilst the first pilot port 46a always remains open, being in constant communication with the gallery 42. The position of the spool 32 thus determines whether fuel is delivered just to the pilot delivery line 18 via both pilot ports 46a, 46b, to the pilot delivery line 18 via both of the pilot ports 46a, 46b and also to the mains delivery line 16 via the mains port 48, or to the pilot delivery line 18 via just the first pilot port 46a and also to the mains delivery line 16 via the mains port 48. It will be appreciated, therefore, that three different pilot/mains fuel flow splits are possible:
 a) pilot delivery only, with the spool 32 in its lowermost position
 b) intermediate, rumble mitigation mode (e.g. 30/70 pilot/mains split), with the spool 32 in a mid-position
 c) normal, low emissions mode (e.g. 10/90 pilot/mains split), with the spool 32 in its uppermost position, as illustrated in FIG. 1

The flow numbers of the restrictions to fuel flow formed by the various parts of the fuel system (e.g. the pilot nozzles and the mains nozzles) determine the split ratios, and the above mentioned splits are merely possible examples. Further, there may be a requirement to provide additional pilot/mains fuel flow split ratios (for example a 50/50 split), which may necessitate a different arrangement of ports in the staging valve 28. Alternatively, there may be a requirement to provide a continuously modulated fuel flow split. This could be achieved with the introduction of a pressure drop servo-throttle valve in the pilot delivery line 18, similar to the arrangement described in U.S. Pat. No. 7,137,242. This throttle valve would maintain a substantially constant pressure drop across the pilot ports in the staging valve 28 and as such provide localised closed loop control of the fuel flow to the pilot delivery line. In turn, this would provide closed loop control of the pilot/mains fuel flow split by virtue of the fact that there is closed loop control of the total metered flow from the FMU 14.

The spool 32 further includes a recirculation gallery 50 which is in constant communication, throughout the range of movement of the spool 32, with a recirculation port 52 which is connected to a low pressure fuel zone 15 on the low pressure side of the pumping unit 12. The recirculation gallery 50 is designed so that, when the spool 32 occupies its lowermost pilot delivery only position (see FIG. 2) in which both pilot ports 46a, 46b communicate with the gallery 42, the recirculation gallery 50 registers with the mains delivery line 16, thus fuel from the mains delivery line 16 and manifold 20 is able to recirculate through the staging valve to the low pressure zone 15 once the recirculation functionality is activated as described hereafter.

In providing the recirculation functionality, the staging system 10 further comprises a recirculation valve 54 in the form of a solenoid operated valve controlling communication between the high pressure side of the pumping unit 12 and a recirculation line 58 connected to the mains manifold 20 via a line 56 and a recirculation orifice 60. In use, when the spool 32 occupies the aforementioned pilot delivery only position and the recirculation valve 54 is open, fuel flow is maintained through the mains manifold 20 and mains delivery line 16 by virtue of a recirculating fuel flow path. Fuel flowing along this recirculating fuel flow path passes along the line 56 from the high pressure side of the fuel pumping unit 12 to the recirculation valve 54 via the recirculation orifice 60, along the recirculation line 58 from the recirculation valve 54 to the mains manifold 20, and from the mains manifold 20 to the low pressure fuel zone 15 on the low pressure side of the fuel pumping unit 12 via the mains delivery line 16 and the recirculation gallery 50 and recirculation port 52 in the staging valve 28. As a consequence, stagnation and degradation of the fuel in the mains delivery line 16 and mains manifold 20 during pilot delivery only operation can be avoided. The restrictions formed by the various elements of the recirculating fuel flow path (i.e. the recirculation valve 54, the recirculation orifice 60 and the recirculation port 52) are chosen to (i)

minimise parasitic leakage losses so that this recirculation function does not impact upon the sizing of the fuel pumping unit 12, (ii) provide sufficient cooling flow, and (iii) ensure that the fuel pressure within the mains manifold 20 is sufficiently low that the mains nozzle check valves 22 remains closed, and there is no fuel delivered to the mains burners of the engine.

When fuel is delivered to the mains burners of the engine, in either the intermediate or normal operating modes described hereinbefore, the recirculation valve 54 is closed, as illustrated in FIG. 1, and the position of the spool 32 prevents a flow of fuel from the mains manifold 20 and the mains delivery line 16 to the low pressure zone 15. The design of the recirculation valve 54 is such that, in these modes of operation, there is a restricted flow of fuel from the supply line 30 to the mains manifold 20, via a further line 57, the recirculation valve 54 and recirculation line 58 which prevents stagnation of fuel in the recirculation line 58.

It will be appreciated that with the arrangement of FIG. 1, good thermal management of the fuel in the mains manifold 20 and mains delivery line 16 can be achieved in a relatively simple and convenient manner.

As illustrated, the line 56 is connected to a point upstream of the metering valve of the fuel system with the result that the recirculating flow of fuel is not drawn from the metered fuel supply. Consequently, the effect of the provision of the recirculation functionality on metering accuracy is minimised. However, there may still be a small impact upon metering accuracy, for example arising from a small change in the position of the associated spill valve and consequently a change in the pressure drop across the metering valve, and/or as a result of an increase in fuel leakage to low pressure within the staging valve.

As mentioned hereinbefore, the pilot nozzle check valves 26a, 26b and associated pilot nozzles are divided into two groups. The nozzle check valves 26b and associated nozzles and the segment 18b of the pilot delivery line 18 are connected to the staging valve 28 via a lean blow out protection valve 62 operable to terminate or substantially reduce the supply of fuel to the nozzle check valves 26b and associated nozzles, when desired, so as to increase the flow of fuel to the nozzle check valves 26a and associated nozzles under low fuel conditions for a given metered flow from the FMU 14. In the arrangement illustrated the valve 62 is controlled by way of a solenoid operated control valve 64. However, it could take other forms, for example it could take the form of a servo-type valve such as an electro hydraulic servo valve. It will be appreciated that since, under low fuel conditions, the flow of fuel to the pilot nozzle check valves and associated nozzles may be restricted to just the nozzle check valves 26a and associated nozzles, the supply of fuel to the nozzle check valves 26b being terminated or significantly reduced by the operation of the valve 62, the risk of a lean blow out condition arising can be reduced.

In use, when fuel delivery occurs through just the pilot nozzle check valves 26a, 26b and associated nozzles, it will be appreciated that the mains manifold 20 is at a relatively low pressure. A priming port 66 (see FIG. 3) is conveniently incorporated into the staging valve 28 so that, as the spool 32 approaches a position in which a mains delivery of fuel is to occur, a restricted flow of fuel to the mains manifold 20 can commence. This ensures that the lines upstream of the mains nozzle check valves 22, which have been drained of fuel, are refilled with fuel at a relatively slow rate, such that when fuel delivery is to occur through the mains nozzle check valves 22 there is not a significant reduction in fuel delivery through the pilot nozzle check valves 26a, 26b to the associated pilot nozzles, which could result in a significant dip in burnt pilot flow and a risk of flame out in the pilot burners.

It will be appreciated that the architecture described hereinbefore provides for reduced thermal degradation issues whilst permitting use of nozzle check valves of a relatively simple, fuel pressure operated, form. The precise form of the nozzle check valves is not of relevance to the invention and so they are not described herein in detail, save to say that they may take the form of simple, passive spring biased valve arrangements located upstream of the associated fuel spray nozzles.

The nozzle check valves connected to the mains delivery line 16 are typically arranged to open when the pressure within the delivery line reaches a desirable value. The pilot nozzle check valves are typically set to open at a reduced pressure which is considerably lower than the opening pressure of the mains nozzle check valves. In order to maintain the correct split of fuel between the pilot and mains delivery lines, and hence between the pilot and mains nozzles, a pilot pressure compensating valve 70 may be conveniently incorporated into the pilot delivery line 18, and set to open at an intermediate level between the opening pressure of the pilot nozzle check valves and the opening pressure of the mains nozzle check valves.

Referring next to FIG. 4, an alternative fuel system 112 is illustrated for use in supplying fuel to the injectors 110 of an aircraft gas turbine engine. The injectors 110 illustrated are each combined pilot and mains injectors, operable to delivery both a pilot fuel delivery and a mains fuel delivery to the associated engine. Although combined injectors are shown, it will be appreciated that this need not always be the case and that the invention is also applicable to other injector arrangements. The injectors 110 are split into two groups. The injectors 110 of a first one of the groups are connected to a first pilot manifold 116a, whilst the injectors 110 of the other group are connected to a second pilot manifold 116b.

Each injector 110 includes a pilot inlet connected via a pilot check valve 114 to the respective pilot fuel manifold 116. A single, common mains manifold 120 is provided, and a mains inlet of each injector 110 is connected via a mains check valve 118 to the mains manifold 120.

The fuel system 112 includes an inlet 122 connected to an outlet of an associated fuel pumping and metering unit 124 whereby fuel is supplied at a metered rate. The inlet 122 is connected to a staging valve 126 which includes a spool 128 slidable within a bore formed in a housing 130. The spool 128 defines an annular gallery 132 which is in constant communication with the inlet 122. The spool 128 is shown in an intermediate position in which the gallery 132 communicates with both a pilot fuel delivery line 134 and a mains fuel delivery line 136. It will be appreciated that, from this position, movement of the spool 128 in a downward direction results in the communication with the mains fuel delivery line 136 being maintained, the communication with the pilot fuel delivery line 134 being restricted. It should be noted that the lowermost position of the spool 128 does not result in communication with the pilot fuel delivery line 134 being broken. Movement of the spool 128 in the upward direction restricts the communication with the mains fuel delivery line 136, whilst communication with the pilot fuel delivery line is substantially unrestricted. In an extreme upper position, communication with the mains fuel delivery line 136 is broken. The mains fuel delivery line 136 is connected to the mains manifold 120. The pilot fuel delivery line 134 is connected to the second pilot manifold 116b.

A staging metering valve 138 is located part way along the pilot fuel delivery line 134 and serves to control the rate at which fuel is able to flow along this line. As the staging metering valve 138 is located in the pilot fuel delivery line 134, it is referred to hereinafter as a pilot metering valve 138. The pilot metering valve 138 comprises a valve member 140 slidable within a bore provided within a valve housing 142. The valve member 140 defines an annular gallery 144 in constant communication with an inlet 146 communicating with an upstream part 134*a* of the pilot fuel delivery line 134. Communication between the gallery 144 and an outlet 148 connected to a downstream part 134*b* of the pilot fuel delivery line 134 depends upon the position of the valve member 140 within the bore. As shown the valve member 140 occupies an intermediate position in which fuel is able to flow along the pilot fuel delivery line at a restricted rate. Movement of the valve member 140 in an upward direction from the position shown allows the rate of fuel supply to increase, downward movement reducing or substantially preventing fuel flow along the pilot fuel delivery line 134. It will be appreciated that the position occupied by the valve member 140 of the pilot metering valve 138 in combination with the operation of the staging valve 126 governs the split ratio or division of fuel between the pilot and mains fuel delivery lines 134, 136.

A torque motor controlled servo valve 150 controls the relative fuel pressures applied to the opposing ends of the valve member 140, and so controls the position of the valve member 140 within its bore. A sensor 152, for example in the form of an LVDT, monitors the position of the valve member 140, and the output of the sensor 152 is used in controlling the operation of the servo valve 150 so as to permit control over the operation of the pilot metering valve 138 in a closed loop manner.

A pressure drop control valve 154 is connected across the pilot metering valve 138. The pressure drop control valve 154 comprises a piston 156 having an end face 156*a* exposed to a fuel pressure related to that at the inlet 146 to the pilot metering valve 138, and an end face 156*b* exposed to a fuel pressure related to that at the outlet 148 of the pilot metering valve 138. A poppet valve member 158 is connected to the piston 156 such that the position of the piston 156 controls whether or not the poppet valve member 158 engages a seat 160, and thus controls whether or not fuel is able to pass through the poppet valve of which the valve member 158 forms part.

As mentioned hereinbefore, the split of fuel between the pilot and mains fuel delivery lines 134, 136 is governed by the position of the valve member 140 of the pilot metering valve 138 in combination with the operation of the staging valve 126. The end faces of the spool 128 and bore of the housing 130 together define upper and lower control chambers 162, 164 in the staging valve 126. The upper control chamber 162 communicates with the gallery 132 by way of flow passages 166 formed within the spool 128. Since the gallery 132 is supplied with fuel at high pressure, in normal use, the upper control chamber 162 is also at high pressure. The lower control chamber 164 is in constant communication, via a fixed restriction 168 and flow washed filter 170, within the inlet 122. The lower control chamber 164 further communicates via a line 171 with the pressure drop control valve 154 such that, when the poppet valve thereof is open, fuel is able to flow from the lower control chamber 164 via the pressure drop control valve 154 to the downstream part of the pilot fuel delivery line 134. Closure of the poppet valve reduces such flow. It will be appreciated that the fuel pressure within the lower control chamber 164 is thus governed, in part, by the operation of the pressure drop control valve 154.

As illustrated, the pressure drop control valve 154 incorporates a spring biasing the piston 156 towards a position in which the poppet valve is closed, and the staging valve 126 includes a spring biasing the spool 128 thereof in an upward direction.

Between the pilot metering valve 138 and the second pilot manifold 116*b*, the pilot fuel delivery line 134 communicates with a lean blow out protection valve 172 which controls communication between the pilot fuel delivery line 134 and the first pilot manifold 116*a*. As shown, the lean blow out protection valve 172 is spring biased towards an open position. A solenoid operated control valve 174 is operable to apply a control pressure to the valve member of the lean blow out protection valve 172 to move it against the action of the spring biasing to a closed position, interrupting the communication between the pilot fuel delivery line 134 and the first pilot manifold 116*a*, when required.

A solenoid operated recirculation valve 176 controls communication between a restricted high pressure line 177 and a recirculation line 178 connected to a recirculation manifold 180. As shown, the recirculation manifold 180 is connected to each of the injectors 110, adjacent the mains check valves 118 thereof.

The spool 128 of the staging valve 126 is provided with a recirculation gallery 182 which, when the spool 128 occupies its extreme upper position, registers with and establishes communication between the mains fuel delivery line 136 and a low pressure return line 184.

In the position shown, fuel supplied to the inlet 122 from the metering unit 124 is split between the pilot and mains fuel delivery lines 134, 136 in a ratio determined by the position of the valve member 140 of the pilot metering valve 138. The lean blow-out protection valve 172 is open, and so fuel is supplied to both of the pilot manifolds 116*a*, 116*b* in addition to the mains manifold 120. Both a pilot and a mains delivery of fuel is thus taking place through each injector 110. If it is desired to change the ratio by which fuel is split between the pilot and mains deliveries, the position of the pilot metering valve 138 is adjusted. For example, to increase the pilot delivery and reduce the mains delivery, the valve member 140 is moved upwards by appropriate control of the servo valve 150. To reduce the pilot delivery and increase the mains delivery, the valve member 140 is moved in a downward direction, again by appropriate control of the servo valve 150.

The adjustment of the position of the valve member 140 will result in a pressure imbalance across the pressure drop control valve 154, moving the piston 156 thereof and hence adjusting the position of the poppet valve member 158. If the piston 156 moves upwards, moving the poppet valve member 158 in the closing direction, fuel flow out of the lower control chamber 164 is restricted causing the fuel pressure within the lower control chamber 164 to increase, and the spool 128 of the staging valve 126 to be displaced in an upward direction, which results in a reduction of the fuel delivery to the mains fuel delivery line 136. If, on the other hand, the piston 156 moves in a downward direction, opening the poppet valve, fuel is able to flow from the lower control chamber 164 at an increased rate, causing the fuel pressure within the lower control chamber 164 to decrease, which results in displacement of the spool 128 in a downward direction. As a consequence the delivery of fuel to the pilot fuel delivery line 134 is throttled.

As previously mentioned, movement of the spool 128 of the staging valve 126 to an uppermost position results in communication between the gallery 132 and the mains delivery line 136 being broken. In practice this is achieved through operation of the torque motor controlled servo valve 150 such that the valve member 140 of the pilot metering valve 138 moves to an uppermost position. This results in the level of communication between the upstream and downstream parts 134a, 134b of the pilot fuel delivery line 134 that could accommodate a level of fuel delivery to line 134 that exceeds the level of fuel supplied by the fuel pumping and metering unit 124. This will result in a pressure imbalance across the pressure drop control valve 154 such that the piston 156 thereof moves upwards and the poppet valve member 158 thereof closes. This results in fuel flow out of the lower control chamber 164 of the staging valve 126 being restricted causing the fuel pressure within the chamber 164 to increase, and the spool 128 of the staging valve 126 to be displaced to its uppermost position, resulting in communication between gallery 132 and the mains delivery line 136 being broken and fuel flow to the mains delivery line 136 ceasing.

If there is only a pilot delivery of fuel to the engine and there is a concern that a lean blow out condition may occur, then the lean blow out protection valve 172 can be closed by appropriate control of the solenoid operated control valve 174, with the result that fuel delivery to the first pilot manifold 116a ceases, whilst that to the second pilot manifold 116b is maintained. It will be appreciated, therefore, that the desired pilot delivery takes place through a reduced number of the injectors 110, resulting in preferential delivery of fuel to this reduced number of injectors 110 and a reduced risk of a lean blow-out condition occurring.

If there is no mains delivery of fuel, the staging valve 126 will occupy its uppermost position. In this position, communication is established between the mains fuel delivery line 136 (and mains manifold 120) and the low pressure return line 184. By opening the recirculation valve 176, a restricted flow of fuel is able to pass via the recirculation line 178 and recirculation manifold 180 to the mains manifold 120 and mains fuel delivery line 136 to the return line 184. This flow of fuel will serve to avoid stagnation of fuel within the mains fuel delivery line 136 and mains manifold 120, as well as within the connections between the mains manifold 120 and the injectors 110, and so reduces the risk of thermal degradation of the fuel in these parts of the fuel system. The pressure in the recirculation line and manifold 178, 180 is sufficiently low that the mains check valves 118 remains closed and so there is no mains delivery of fuel to the engine. In addition to assisting in avoiding thermal degradation, the recirculation valve 176 also serves to ensure that the mains fuel delivery line 136 and mains manifold 120 are primed which ensures that there is little or no impact on the combustion performance of the engine when it is desired to commence a mains delivery of fuel to the engine.

The arrangement described hereinbefore is advantageous in that a wide range of pilot/mains fuel delivery split ratios can be achieved accurately in a relatively simple and convenient manner. Lean blow out protection and mains manifold fuel cooling functionality can also be achieved.

It will be appreciated that the primary difference between the embodiment of FIG. 4 and the scheme of FIG. 1 relates to the manner in which the respective staging valve arrangements are controlled. With the exception of this distinction, much of the description hereinbefore applies to both arrangements.

FIG. 5 illustrates an alternative arrangement to the schemes described hereinbefore. For the most part the arrangement of FIG. 5 operates in substantially the same manner as that of FIG. 1, and the associated ones of the other drawings, and so only the significant differences therebetween will be described below, and like reference numerals are used to denote like parts. It will be appreciated, however, that the alternative arrangement of FIG. 5 could be applied to the scheme of FIG. 4.

In the scheme illustrated in FIG. 1, the recirculation connection is provided by means of the recirculation gallery 50 provided in the spool 32 of the staging valve 28. In the arrangement of FIG. 5, this recirculation connection is removed from the staging valve 28 and instead a separate valve 70 is provided to control the return of recirculating fuel from the high pressure mains delivery line 16 and manifold 20. The valve 70 comprises a valve member 72, the end faces of which are of different effective areas, and moveable between an open position (shown) in which fuel is able to pass from the mains manifold 20 to the low pressure side of the pumping unit, and a closed position in which such flow is not permitted. The upper end face of the valve member 72 is exposed to fuel at substantially the pressure upstream of the recirculation control valve 54. Thus, when the recirculation control valve 54 is closed so as to prevent the supply of fuel under high pressure to the recirculation line 58, the pressure applied to the valve member 72 is sufficient to hold the valve in its closed position. Upon opening of the recirculation control valve 54 to allow the commencement of a recirculating flow, the pressure applied to the valve member 72 will fall by virtue of the presence of the orifice 60, thereby allowing the valve 70 to open and so permitting return of the recirculating fuel flow from the mains delivery line 16 and manifold 20 to the low pressure fuel zone 15.

The valve member 72 of valve 70 is illustrated as a single part construction in FIG. 5. However, it is recognised that for ease of manufacture, this valve member 72 may need to be of two part construction. This two part construction is well know to those skilled in the art and does not affect the operation of the valve 70 as described hereinbefore. As such, this two part construction of valve member 72 will not be described in further detail.

The operation of the remainder of the scheme shown in FIG. 5 is substantially as described hereinbefore and so will not be described in further detail.

Whilst embodiments of the invention are described herein, it will be appreciated that a wide range of modifications and alterations are possible without departing from the scope of the invention.

The invention claimed is:

1. A fuel staging system comprising:
   a staging valve configured to divide a metered fuel supply between a pilot delivery line and a mains delivery line;
   a recirculation valve connected to the mains delivery line, the recirculation valve being configured to supply a recirculation fuel flow to the mains delivery line when the staging valve occupies a position in which substantially no fuel is delivered to the mains delivery line through the staging valve; and
   a closable recirculation connection returning fuel from the mains delivery line to a low pressure fuel zone on a low pressure side of a pumping unit when the recirculation fuel flow is supplied to the mains delivery line, wherein the closable recirculation connection is defined, at least in part, by a separate valve from the staging valve, and a special line that is directly connected to a feed line upstream of the recirculation valve, and that connects to the separate valve, and wherein a pressure in the special line moves the separate valve between an open and a closed position.

2. The system according to claim 1, wherein the recirculation valve is a solenoid operated valve.

3. The system according to claim 1, wherein the pilot delivery line and the mains delivery line are respectively associated with a plurality of fuel pressure operated nozzles including a plurality of integrated check valves that are arranged to open when the fuel pressure within the respective associated delivery line exceeds a predetermined fuel pressure.

4. The system according to claim 1, wherein the pilot delivery line includes a segment closable by a lean blow out protection valve configured to control a number of pilot nozzles through which fuel is delivered.

5. The system according to claim 4, further comprising a solenoid operated control valve configured to control the operation of the lean blow out protection valve.

* * * * *